(12) United States Patent
Shiraishi et al.

(10) Patent No.: US 6,614,624 B2
(45) Date of Patent: Sep. 2, 2003

(54) SUSPENSION AND HEAD GIMBAL ASSEMBLY WITH THE SUSPENSION

(75) Inventors: Masashi Shiraishi, Kwai Chung (HK); Takehiro Kamigama, Kwai Chung (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 0 days.

(21) Appl. No.: 10/002,001

(22) Filed: Dec. 5, 2001

(65) Prior Publication Data

US 2002/0071218 A1 Jun. 13, 2002

(30) Foreign Application Priority Data

Dec. 8, 2000 (JP) ........................................ 2000-374442

(51) Int. Cl.⁷ .............................................. G11B 5/596
(52) U.S. Cl. ..................................................... 360/245.9
(58) Field of Search ............................... 360/245.9, 246

(56) References Cited

U.S. PATENT DOCUMENTS 5,995,328 A * 11/1999 Balakrishnan ........... 360/245.9

* cited by examiner

*Primary Examiner*—Robert S. Tupper
(74) *Attorney, Agent, or Firm*—Armstrong, Westerman & Hattori, LLP (57) ABSTRACT

A suspension for supporting a head slider which has at least one write head element with terminal electrodes and at least one read head element with terminal electrodes includes a resilient suspension member, and a lead conductor member including a pair of first trace conductors and a pair of second trace conductors. One ends of the pair of first trace conductors are electrically connected to the terminal electrodes of the at least one write head element, and one ends of the pair of second trace conductors are electrically connected to the terminal electrodes of the at least one read head element. At least part of the lead conductor member is fixed to the suspension member. The pair of first trace conductors are separately located at opposite side regions of the suspension member in a top end section of the suspension member, respectively.

24 Claims, 4 Drawing Sheets

SUSPENSION AND HEAD GIMBAL ASSEMBLY WITH THE SUSPENSION

FIELD OF THE INVENTION

The present invention relates to a suspension for supporting a head slider provided with a write head element and a read head element, used in a magnetic disk drive (HDD) unit or in an optical disk drive unit for example, and to a head gimbal assembly (HGA) provided with the suspension.

DESCRIPTION OF THE RELATED ART

In an HDD, magnetic write head elements for writing magnetic information onto magnetic hard disks and magnetic read head elements for reading magnetic information from the magnetic disks are in general formed on magnetic head sliders flying in operation above the rotating magnetic disks. The sliders are supported at top end sections of suspensions of HGAs, respectively.

In each suspension, one ends of two pairs of signal lines are electrically connected to a pair of terminal electrodes of the magnetic write head element and to a pair of terminal electrodes of the magnetic read head element formed on the magnetic head slider, respectively. These four signal lines run along the suspension and the other ends of these signal lines are electrically connected to external connection pads formed on the back end section or outside of the suspension, respectively.

Recently, a suspension using no lead wire for the signal lines or a lead line member, that is, a wireless suspension or a suspension using flexible print circuit (FPC) has widely spread.

The wireless suspension is configured by directly laminating a resin layer, a trace conductor layer and an overcoat layer on the suspension as for signal lines, or by fixing or laser-welding to the suspension a separated stainless steel thin plate on which a resin layer, a trace conductor layer and an overcoat layer are preliminarily formed.

The suspension with FPC is configured by adhering on a normal suspension a FPC fabricated by forming trace conductors on a resin base layer and by forming a resin overcoat layer on the resin base layer to cover the trace conductors.

At the top end section of the wireless suspension or the suspension with FPC, two write signal lines electrically connected to two terminal electrodes of the write head element and also two read signal lines electrically connected to two terminal electrodes of the read head element are in general formed as trace conductors running along opposite side edges of the suspension so as to reduce an influence from EMS noise. That is, the two write signal lines are formed as two trace conductors passing through one outrigger, and the two read signal lines are formed as two trace conductors passing through the other outrigger.

In the latest HDD, to satisfy the demand for further increase of record capacity, a track density becomes very high and thus a gap between the adjacent tracks of the magnetic disk becomes remarkably narrow. Therefore, a magnetic head used for writing onto and/or reading from such high track density magnetic disk is required to very precisely control its position along the track width direction.

In an HGA used in the high track density HDD, if the trace conductors are heated due to the write current, the thermal expansion of the suspension may occur to produce a displacement of a magnetic head slider attached on the suspension. Namely, in the conventional HGA, the pair of trace conductors for the write head element are formed on one outrigger of the suspension. Therefore, if only this one outrigger is heated by the write current of several tens mA, for example about 40–50 mA, and thermally expanded, the top end section of the suspension will be temporally deformed toward the lateral direction from its axis causing the displacement of the magnetic head slider toward the track width direction.

In case of the HGA used in the low track density HDD, such displacement of the slider due to the thermal expansion of the outrigger presents no problem. However, in case of an HGA used for the high track density HDD, such small displacement may become significant problems.

SUMMARY OF THE INVENTION

It is therefore an object of the present invention to provide a high track density adaptable suspension and an HGA with the suspension, whereby a displacement of a magnetic head due to thermal expansion of the suspension can be effectively prevented.

According to the present invention, a suspension for supporting a head slider which has at least one write head element with terminal electrodes and at least one read head element with terminal electrodes includes a resilient suspension member, and a lead conductor member including a pair of first trace conductors and a pair of second trace conductors. One ends of the pair of first trace conductors are electrically connected to the terminal electrodes of the at least one write head element, and one ends of the pair of second trace conductors are electrically connected to the terminal electrodes of the at least one read head element. At least part of the lead conductor member is fixed to the suspension member. The pair of first trace conductors are separately located at opposite side regions of the suspension member in a top end section of the suspension member, respectively.

According to the present invention, also, an HGA includes a head slider which has at least one write head element with terminal electrodes and at least one read head element with terminal electrodes, and the above-mentioned suspension for supporting at its top end section the head slider.

Since the pair of first trace conductors served to flow a write current there through are separately formed on opposite side regions of the suspension member in a top end section of the suspension member, respectively, heating sources of Joule heat are separated into the different side regions to reduce a local heating value itself. Also, since right and left side regions of the suspension member are heated with the same current, the amount of thermal expansion at these side regions becomes almost equal to each other resulting that both the side regions temporally deform the same direction along the axis of the suspension member. Therefore, no displacement of the head slider toward the track width direction occurs. As a result, a higher track-density-ready suspension and HGA can be obtained.

It is preferred that the top end section of the suspension member has two arms or outriggers running along opposite side edges of the suspension member and a head slider support or tongue coupled with top ends of the two arms, and that the pair of first trace conductors are formed on the two arms, respectively.

It is also preferred that the lead conductor member includes a resin layer directly laminated on the suspension member, the pairs of first and second trace conductors formed on the resin layer, and an overcoat layer for covering the pairs of first and second trace conductors.

It is preferred that the lead conductor member includes a resin layer laminated on a thin metal plate which is fixed to the suspension member, the pairs of first and second trace conductors formed on the resin layer, and an overcoat layer for covering the pairs of first and second trace conductors.

It is also preferred that the lead conductor member includes a FPC member consisting of a resin layer, the pairs of first and second trace conductors formed on the resin layer, and an overcoat layer for covering the pairs of first and second trace conductors.

It is also preferred that the pair of second trace conductors are separately located at opposite side regions of the suspension member in the top end section of the suspension member, respectively.

Preferred is also that the lead conductor member further includes ground (GND) conductors or source voltage (Vcc) conductors each inserted between the first trace conductor and the second trace conductor separately located at each side region. Each of the GND conductors or Vcc conductors serves as a shield pattern between the first trace conductor and second tarce conductor so that when harmonic components are produced on the first trace conductors due to overshoots at the rising and falling edges of the write current, no inductive electromotive force will be induced on the adjacent second trace conductors. Therefore, even if a write current with steep rising and falling edges is used in order to achieve a high data rate, change in performance and destruction of the read head element due to the produced inductive electromotive force can be effectively prevented. It should be noted that this advantage can be obtained only by additionally forming the GND conductor pattern or the Vcc conductor pattern during the conductor member forming process without increasing the number of the manufacturing processes and the manufacturing cost of the HGA.

It is preferred that the lead conductor member includes a resin layer directly laminated on the suspension member, the pairs of first and second trace conductors formed on the resin layer, the GND conductors or Vcc conductors formed on the resin layer, and an overcoat layer for covering the pairs of first and second trace conductors and the GND conductors or Vcc conductors.

It is also preferred that the lead conductor member includes a resin layer laminated on a thin metal plate which is fixed to the suspension member, the pairs of first and second trace conductors formed on the resin layer, the GND conductors or Vcc conductors formed on the resin layer, and an overcoat layer for covering the pairs of first and second trace conductors and the GND conductors or Vcc conductors.

It is preferred that the lead conductor member includes a FPC member consisting of a resin layer, the pairs of first and second trace conductors formed on the resin layer, the GND conductors or Vcc conductors formed on the resin layer, and an overcoat layer for covering the pairs of first and second trace conductors and the GND conductors or Vcc conductors.

It is further preferred that the suspension member includes a base plate, a load beam coupled with the base plate, and a resilient flexure fixed to a top end section of the load beam for mounting the head slider.

It is preferred that the at least one write head element and the at least one read head element are at least one magnetic write head element and at least one magnetic read head element, respectively. In this case, the at least one magnetic read head element may be a magnetoresistive effect (MR) read head element.

Further objects and advantages of the present invention will be apparent from the following description of the preferred embodiments of the invention as illustrated in the accompanying drawings.

BRIEF DESCRIPTION OF THE DRAWINGS

FIG. 1a shows a plane view illustrating the whole structure of an HGA seen from a slider-mounting surface in a preferred embodiment according to the present invention;

FIG. 1b shows an oblique view illustrating a magnetic head slider in the embodiment shown in FIG. 1a;

FIG. 2 shows an enlarged view of a top end section of a suspension in the embodiment shown in FIG. 1a;

FIG. 4a shows a plane view illustrating the whole structure of an HGA seen from a slider-mounting surface in another embodiment according to the present invention;

FIG. 4b shows an oblique view illustrating a magnetic head slider in the embodiment shown in FIG. 4a;

FIG. 5 shows an enlarged view of a top end section of a suspension in the embodiment shown in FIG. 4a.

DESCRIPTION OF THE PREFERRED EMBODIMENTS

Figures 1A, 1B:
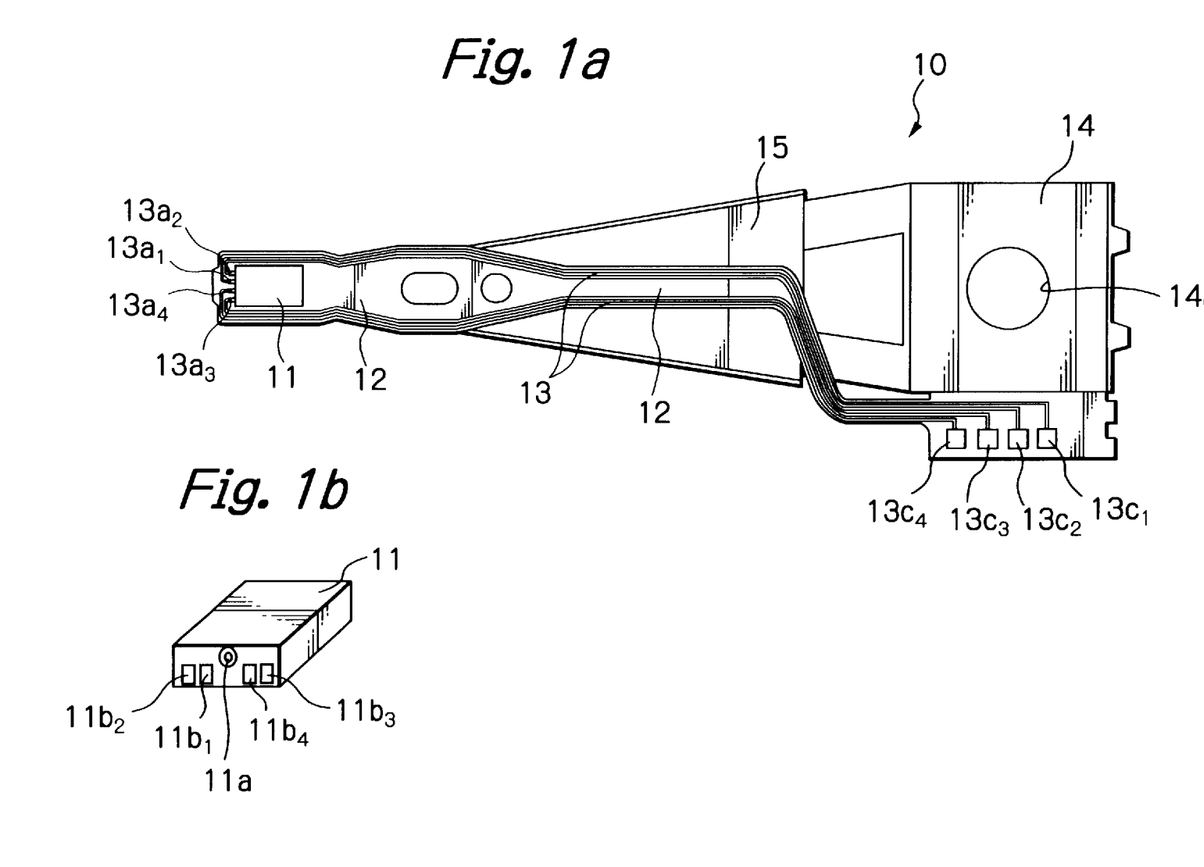
Figure 2:
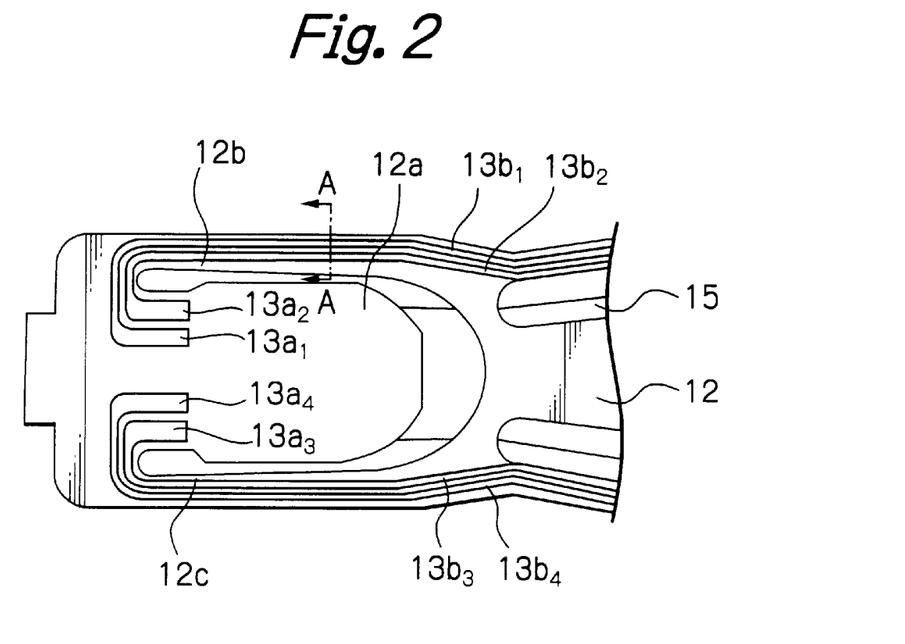
Figure 3:
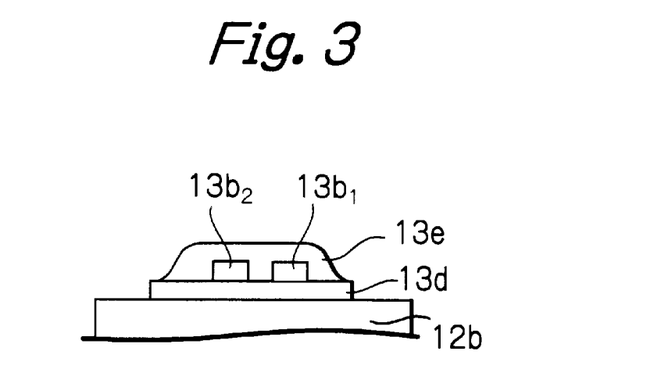
FIG. 3 shows an A—A line sectional view of FIG. 2.

FIG. 1a illustrates the whole structure of an HGA seen from a slider-mounting surface in a preferred embodiment according to the present invention, FIG. 1b illustrates a magnetic head slider in this embodiment, FIG. 2 illustrates an enlarged view of a top end section of a suspension in this embodiment, and FIG. 3 illustrates an A—A line sectional view of FIG. 2.

As shown in FIGS. 1a, 1b and 2, the HGA in this embodiment has a suspension 10, a magnetic head slider 11 provided with a thin-film write head element 11a and a thin-film MR read head element 11a, fixed to a top end section of the suspension 10, and a lead conductor member 13 directly formed on a flexure 12 of the suspension 10. Two terminal electrodes $11b_1$ and $11b_4$ of the thin-film write head element are electrically connected to two head connection pads $13a_1$ and $13a_4$ of the conductor member 13, and two terminal electrodes $11b_2$ and $11b_3$ of the thin-film MR read head element are electrically connected to two head connection pads $13a_2$ and $13a_3$ of the conductor member 13 by ball bonding using for example Au balls or solder balls, respectively.

The magnetic head slider 11 has, as shown in FIG. 1b, the thin-film write head element 11a, the thin-film MR read head element 11a, the terminal electrodes $11b_1$ and $11b_4$ connected to the thin-film write head element, and the terminal electrodes $11b_2$ and $11b_3$ connected to the thin-film MR read head element.

The suspension 10 itself is substantially formed by a base plate 14 with an attaching section 14a used to fix with a drive arm (not shown), a resilient load beam 15 fixed to the base plate 14 and the resilient flexure 12 fixed to a part of the load beam 15 for mounting the magnetic head slider 11 at its top end section.

The base plate 14 is made of in this embodiment a stainless steel or iron plate and fixed to a base section of the load beam 15 by welding. The HGA is attached to the drive arm by fixing the base plate 14 at its attaching section 14a.

The load beam 15 has elasticity providing, to the flexure 12, a force for pressing the magnetic head slider 11 toward the direction of a magnetic disk surface in operation. This load beam 15 supports the flexure 12 and is made of in this embodiment a stainless steel plate (for example SUS304TA) with a thickness of about 60–65 µm. The fixing of the load beam 15 with the flexure 12 is performed by pinpoint welding at a plurality of points.

The flexure 12 has a flexible tongue 12a depressed by a dimple (not shown) formed on the load beam 15 and has elasticity for flexibly supporting by this tongue 12a the magnetic head slider 11 to provide a free attitude to the slider. The flexure 12 is made of in this embodiment a stainless steel plate (for example SUS304TA) with a thickness of about 25 µm. In case of the suspension with a three piece structure where the flexure 12 and the load beam 15 are formed in independent components as in this embodiment, the rigidity of the flexure 12 will be set lower than that of the load beam 15.

A flexible lead conductor member 13 including a plurality of trace conductors of a thin-film multi-layered pattern is directly formed or disposed on the flexure 12. The conductor member 13 is formed by a known method similar to the patterning method of forming a printed circuit board on a thin metal plate such as a flexible printed circuit (FPC). As shown in FIG. 3, the member 13 is formed by sequentially depositing a first insulation material layer 13d made of a resin such as polyimide with a thickness of about 10 µm, patterned Cu layers (trace conductors) $13b_1$ and $13b_2$ with a thickness of about 10 µm, and a second insulation material layer 13e made of a resin such as polyimide with a thickness of about 10 µm on the flexure 12 in this order. A width of the trace conductor and a space of the trace conductors are about 40 µm. Within the regions of the head connection pads $13a_1$ to $13a_4$ formed for connecting with the magnetic head element and the external connection pads $13c_1$ to $13c_4$ formed for connecting with an external circuit, an Au layer is deposited on the Cu layer and there is no second insulation material layer on the Au layer.

The lead conductor member 13 includes four trace conductors $13b_1$ to $13b_4$. One ends of these trace conductors $13b_1$ to $13b_4$ are connected to the aforementioned head connection pads $13a_1$ to $13a_4$, respectively. The other ends of the trace conductors $13b_1$ to $13b_4$ are connected to the external connection pads $13c_1$ to $13c_4$ used for electrical connection with the external circuit, respectively.

The two trace conductors $13b_1$ and $13b_2$ pass through one side region (right-hand side region) of the member 13 and then electrically connected to one terminal electrode $11b_1$ of the write head element and to one terminal electrode $11b_2$ of the MR read head element. The two trace conductors $13b_4$ and $13b_3$ pass through the other side region (left-hand side region) of the member 13 and then electrically connected to the other terminal electrode $11b_4$ of the write head element and to the other terminal electrode $11b_3$ of the MR read head element. In other words, the trace conductor $13b_1$ electrically connected to one terminal electrode $11b_1$ of the write head element and the trace conductor $13b_2$ electrically connected to one terminal electrode $11b_2$ of the MR read head element are formed to pass through one (right-hand side) outrigger or arm 12b that runs along one side edge of the flexure 12, and the trace conductor $13b_4$ electrically connected to the other terminal electrode $11b_4$ of the write head element and the trace conductor $13b_3$ electrically connected to the other terminal electrode $11b_3$ of the MR read head element are formed to pass through the other (left-hand side) outrigger or arm 12c that runs along the other side edge of the flexure 12.

As above-mentioned, the pair of trace conductors $13b_1$ and $13b_4$ connected to the write head element and served to flow a write current are separately formed on the different outriggers 12b and 12c located at opposite sides of the flexure 12, respectively. Thus, heating sources of Joule heat are separated into the different outriggers 12b and 12c of the flexure 12 to reduce a local heating value itself. Also, since both the outriggers 12b and 12c are heated with the same current, the amount of thermal expansion at these outriggers becomes almost equal to each other resulting that both the outriggers temporally deform the same direction along the axis of the suspension. Therefore, no displacement of the magnetic head slider 11 toward the track width direction occurs. As a result, a higher track-density-ready suspension and HGA can be obtained.

Figures 4A, 4B:
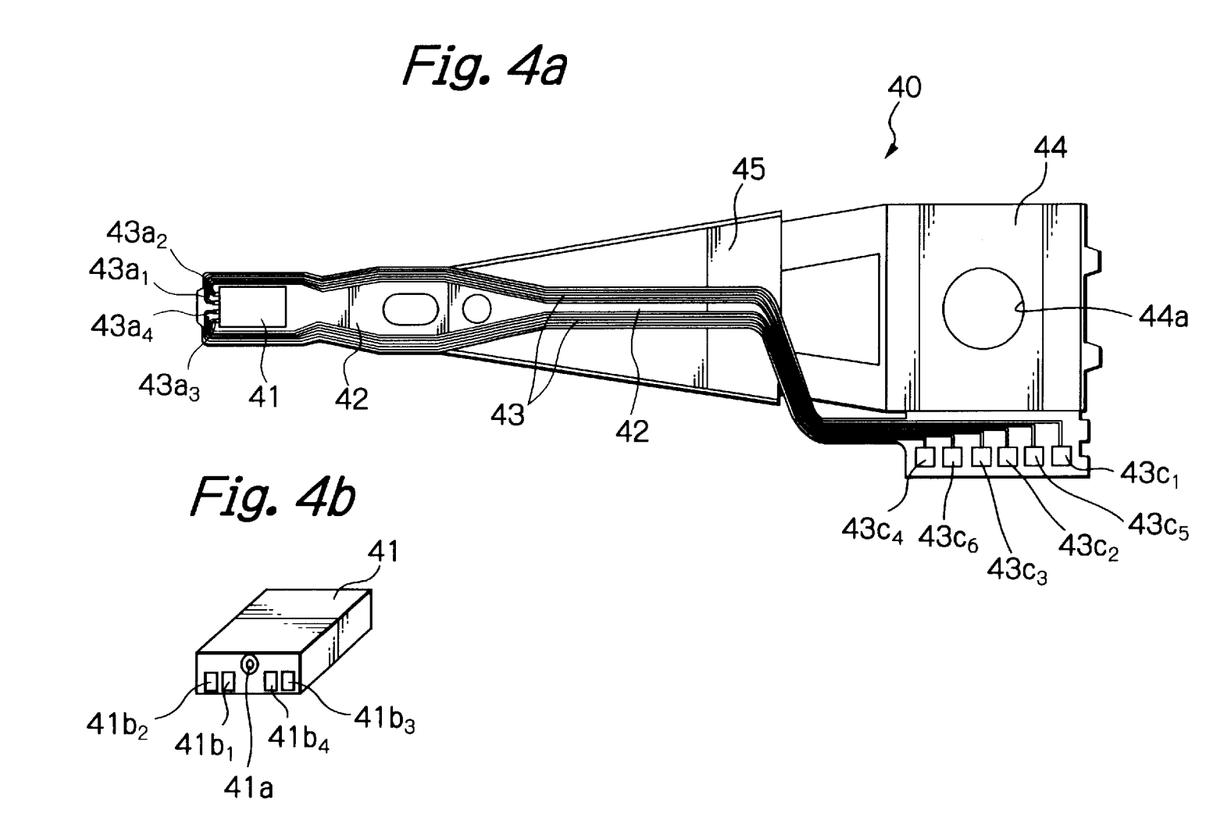
Figure 5:
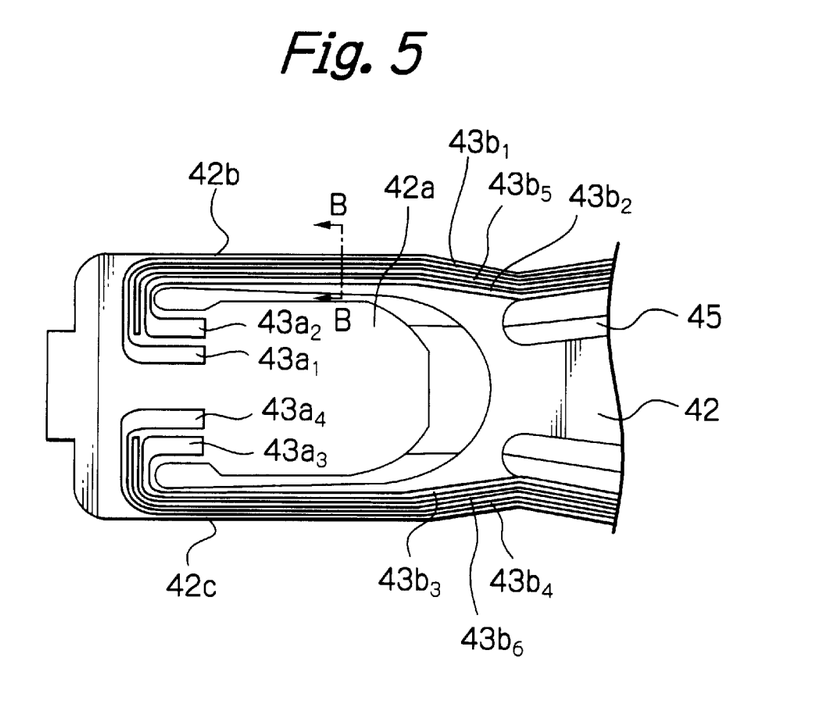
Figure 6:
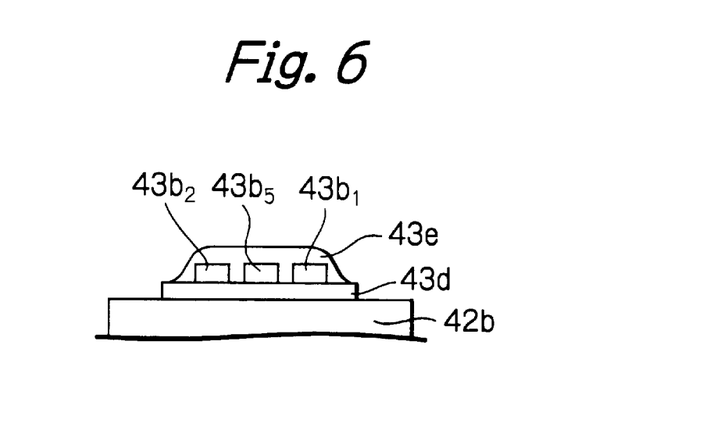
FIG. 6 shows a B—B line sectional view of FIG. 5.

FIG. 4a illustrates the whole structure of an HGA seen from a slider-mounting surface in another embodiment according to the present invention, FIG. 4b illustrates a magnetic head slider in this embodiment, FIG. 5 illustrates an enlarged view of a top end section of a suspension in this embodiment, and FIG. 6 illustrates a B—B line sectional view of FIG. 5.

As shown in FIGS. 4a, 4b and 5, the HGA in this embodiment has a suspension 40, a magnetic head slider 41 provided with a thin-film write head element 41a and a thin-film MR read head element 41a, fixed to a top end section of the suspension 40, and a lead conductor member 43 directly formed on a flexure 42 of the suspension 40. Two terminal electrodes $41b_1$ and $41b_4$ of the thin-film write head element are electrically connected to two head connection pads $43a_1$ and $43a_4$ of the conductor member 43, and two terminal electrodes $41b_2$ and $41b_3$ of the thin-film MR read head element are electrically connected to two head connection pads $43a_2$ and $43a_3$ of the conductor member 43 by ball bonding using for example Au balls or solder balls, respectively.

The magnetic head slider 41 has, as shown in FIG. 4b, the thin-film write head element 41a, the thin-film MR read head element 41a, the terminal electrodes $41b_1$ and $41b_4$ connected to the thin-film write head element, and the terminal electrodes $41b_2$ and $41b_3$ connected to the thin-film MR read head element.

The suspension 40 itself is substantially formed by a base plate 44 with an attaching section 44a used to fix with a drive arm (not shown), a resilient load beam 45 fixed to the base plate 44 and the resilient flexure 42 fixed to a part of the load beam 45 for mounting the magnetic head slider 41 at its top end section.

The base plate 44 is made of in this embodiment a stainless steel or iron plate and fixed to a base section of the load beam 45 by welding. The HGA is attached to the drive arm by fixing the base plate 44 at its attaching section 44a.

The load beam 45 has elasticity providing, to the flexure 42, a force for pressing the magnetic head slider 41 toward the direction of a magnetic disk surface in operation. This load beam 45 supports the flexure 42 and is made of in this embodiment a stainless steel plate (for example SUS304TA) with a thickness of about 60–65 µm. The fixing of the load beam 45 with the flexure 42 is performed by pinpoint welding at a plurality of points.

The flexure 42 has a flexible tongue 42a depressed by a dimple (not shown) formed on the load beam 45 and has elasticity for flexibly supporting by this tongue 42a the magnetic head slider 41 to provide a free attitude to the slider. The flexure 42 is made of in this embodiment a stainless steel plate (for example SUS304TA) with a thickness of about 25 µm. In case of the suspension with a three piece structure where the flexure 42 and the load beam 45 are formed in independent components as in this embodiment, the rigidity of the flexure 42 will be set lower than that of the load beam 45.

A flexible lead conductor member 43 including a plurality of trace conductors of a thin-film multi-layered pattern is directly formed or disposed on the flexure 42. The conductor member 43 is formed by a known method similar to the patterning method of forming a printed circuit board on a thin metal plate such as a flexible printed circuit (FPC). As shown in FIG. 6, the member 43 is formed by sequentially depositing a first insulation material layer 43d made of a resin such as polyimide with a thickness of about 10 $\mu$m, patterned Cu layers (trace conductors and a ground (GND) conductor or a source voltage (Vcc) conductor) $43b_1$, $43b_2$ and $43b_5$ with a thickness of about 10 $\mu$m, and a second insulation material layer 43e made of a resin such as polyimide with a thickness of about 10 $\mu$m on the flexure 42 in this order. A width of the trace conductor and the GND conductor or the Vcc conductor and a space of the conductors are about 40 $\mu$m. Within the regions of the head connection pads $43a_1$ to $43a_4$ formed for connecting with the magnetic head element and the external connection pads $43c_1$ to $43c_6$ formed for connecting with an external circuit, an Au layer is deposited on the Cu layer and there is no second insulation material layer on the Au layer.

The lead conductor member 43 includes six conductors $43b_1$ to $43b_6$. One ends of the trace conductors $43b_1$ to $43b_4$ are connected to the aforementioned head connection pads $43a_1$ to $43a_4$, respectively. The other ends of the trace conductors $43b_1$ to $43b_4$ are connected to the external connection pads $43c_1$ to $43c_4$ used for electrical connection with the external circuit, respectively. One ends of the GND conductors or Vcc conductors $43b_5$ and $43b_6$ are extended to a section where the trace conductors $43b_1$ to $43b_4$ are connected to the head connection pads $43a_1$ to $43a_4$ and terminated in floating at that section. The other ends of the GND conductors or Vcc conductors $43b_5$ and $43b_6$ are connected to the external connection pads $43c_5$ and $43c_6$, respectively. These external connection pads $43c_5$ and $43c_6$ are grounded or connected to the voltage source line.

The two trace conductors $43b_1$ and $43b_2$ pass through one side region (right-hand side region) of the member 43 and then electrically connected to one terminal electrode $41b_1$ of the write head element and to one terminal electrode $41b_2$ of the MR read head element. The GND conductor or Vcc conductor $43b_5$ is inserted with spacing between these trace conductors $43b_1$ and $43b_2$. The two trace conductors $43b_4$ and $43b_3$ pass through the other side region (left-hand side region) of the member 43 and then electrically connected to the other terminal electrode $41b_4$ of the write head element and to the other terminal electrode $41b_3$ of the MR read head element. The GND conductor or Vcc conductor $43b_6$ is inserted with spacing between these trace conductors $43b_4$ and $43b_3$. In other words, the trace conductor $43b_1$ electrically connected to one terminal electrode $41b_1$ of the write head element, the trace conductor $43b_2$ electrically connected to one terminal electrode $41b_2$ of the MR read head element, and the GND conductor or Vcc conductor $43b_5$ inserted between the trace conductors $43b_1$ and $43b_2$ are formed to pass through one (right-hand side) outrigger or arm 42b that runs along one side edge of the flexure 42. Also, the trace conductor $43b_4$ electrically connected to the other terminal electrode $41b_4$ of the write head element, the trace conductor $43b_3$ electrically connected to the other terminal electrode $41b_3$ of the MR read head element, and the GND conductor or Vcc conductor $43b_6$ inserted between the trace conductors $43b_4$ and $43b_3$ are formed to pass through the other (left-hand side) outrigger or arm 42c that runs along the other side edge of the flexure 42.

As above-mentioned, the one pair of trace conductors $43b_1$ and $43b_4$ electrically connected to the write head element and served to flow a write current are separately formed on the different outriggers 42b and 42c located at opposite sides of the flexure 42, respectively. Thus, heating sources of Joule heat are separated into the different outriggers 42b and 42c of the flexure 42 to reduce a local heating value itself. Also, since both the outriggers 42b and 42c are heated with the same current, the amount of thermal expansion at these outriggers becomes almost equal to each other resulting that both the outriggers temporally deform the same direction along the axis of the suspension. Therefore, no displacement of the magnetic head slider 41 toward the track width direction occurs. As a result, a higher track-density-ready suspension and HGA can be obtained.

In this embodiment, the GND conductor or Vcc conductor $43b_5$ serves as a shield pattern between the trace conductors $43b_1$ and $43b_2$ and the GND conductor or Vcc conductor $43b_6$ serves as a shield pattern between the trace conductors $43b_4$ and $43b_3$. Thus, when harmonic components are produced on the trace conductors $43b_1$ and $43b_4$ due to overshoots at the rising and falling edges of the write current, no inductive electromotive force will be induced on the trace conductors $43b_2$ and $43b_3$. Therefore, even if a write current with steep rising and falling edges is used in order to achieve a high data rate, change in performance and destruction of the magnetic read head element due to the produced inductive electromotive force can be effectively prevented. It should be noted that this advantage can be obtained only by additionally forming the GND conductor pattern or the Vcc conductor pattern during the conductor member forming process without increasing the number of the manufacturing processes and the manufacturing cost of the HGA.

The GND conductors or the Vcc conductors are formed along the whole length of the trace conductors in this embodiment. However, these GND conductors or Vcc conductors may be partially formed only between the trace conductors that are adjacent to each other with a narrow space.

In the aforementioned embodiments, the trace conductors $13b_2$ ($43b_2$) and $13b_3$ ($43b_3$) electrically connected to the MR read head element are separately formed at the different outriggers 12b (42b) and 12c (42c) similar to the trace conductors $13b_1$ ($43b_1$) and $13b_4$ ($43b_4$) electrically connected to the write head element. However, important is to position the trace conductors $13b_1$ ($43b_1$) and $13b_4$ ($43b_4$) for the write current at the different outriggers, but the trace conductors $13b_2$ ($43b_2$) and $13b_3$ ($43b_3$) may be positioned at the same outrigger.

Further, it is apparent that the suspension according to the present invention is not limited to the three piece structure with a base plate, a load beam and a flexure, but may be a four piece structure with a base plate, a hinge, a load beam and a flexure or a two piece structure with a base plate and a flexure-load beam.

The aforementioned embodiments use a wireless suspension with a resin layer directly formed on the suspension, a trace conductors (and GND conductors or Vcc conductors) formed on the resin layer and an overcoat layer for covering the trace conductors (and GND conductors or Vcc conductors). However, a wireless suspension with a thin metal plate on which a resin layer, a trace conductors (and GND conductors or Vcc conductors) formed on the resin layer and an overcoat layer for covering the trace conductors (and GND conductors or Vcc conductors) are preliminarily formed, or a suspension with a FPC can be used in the present invention. Since the basic structure of these suspensions is well-known in this field, descriptions and drawings of them are omitted.

In the aforementioned embodiments also, an HGA for a magnetic head slider with thin-film magnetic head elements is described. However, it is apparent that the present invention can be applied to an HGA for a head element such as an optical head element other than the HGA with the thin-film magnetic head element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A suspension for supporting a head slider which includes at least one write head element with terminal electrodes and at least one read head element with terminal electrodes, comprising:

a resilient suspension member; and a lead conductor member including a pair of first trace conductors and a pair of second trace conductors, one end of each of said pair of first trace conductors being electrically connected to the terminal electrodes of said at least one write head element, one end of each of said pair of second trace conductors being electrically connected to the terminal electrodes of said at least one read head element, at least part of said lead conductor member being fixed to said suspension member, one trace conductor of said pair of first trace conductors being separately located at a side region of said suspension member in a top end section of said suspension member, and the other trace conductor of said pair of first trace conductors being separately located at an other side region of said suspension member in said top end section of said suspension member.

2. The suspension as claimed in claim 1, wherein the top end section of said suspension member has two arms running along opposite side edges of said suspension member and a head slider support coupled with top ends of said two arms, and wherein one trace conductor of said pair of first trace conductors is formed on each of said two arms.

3. The suspension as claimed in claim 1, wherein said lead conductor member includes a resin layer directly laminated on said suspension member, said pairs of first and second trace conductors formed on said resin layer, and an overcoat layer for covering said pairs of first and second trace conductors.

4. The suspension as claimed in claim 1, wherein said lead conductor member includes a resin layer laminated on a thin metal plate which is fixed to said suspension member, said pairs of first and second trace conductors formed on said resin layer, and an overcoat layer for covering said pairs of first and second trace conductors.

5. The suspension as claimed in claim 1, wherein said lead conductor member includes a FPC member consisting of a resin layer, said pairs of first and second trace conductors formed on said resin layer, and an overcoat layer for covering said pairs of first and second trace conductors.

6. The suspension as claimed in claim 1, wherein one trace conductor of said pair of second trace conductors are separately located at a side region of said suspension member in the top end section of said suspension member, and the other trace conductor of said pair of first trace conductors being separately located at an other side region of said suspension member in said top end section of said suspension member.

7. The suspension as claimed in claim 6, wherein said lead conductor member further includes a pair of ground conductors or a pair of source voltage conductors one of said pair of conductors inserted between said trace conductors at said side region and an other of said pair of conductors inserted between said trace conductors at said other side region.

8. The suspension as claimed in claim 7, wherein said lead conductor member includes a resin layer directly laminated on said suspension member, said pairs of first and second trace conductors formed on said resin layer, said ground conductors or source voltage conductors formed on said resin layer, and an overcoat layer for covering said pairs of first and second trace conductors and said ground conductors or source voltage conductors.

9. The suspension as claimed in claim 7, wherein said lead conductor member includes a resin layer laminated on a thin metal plate which is fixed to said suspension member, said pairs of first and second trace conductors formed on said resin layer, said ground conductors or source voltage conductors formed on said resin layer, and an overcoat layer for covering said pairs of first and second trace conductors and said ground conductors or source voltage conductors.

10. The suspension as claimed in claim 7, wherein said lead conductor member includes a FPC member consisting of a resin layer, said pairs of first and second trace conductors formed on said resin layer, said ground conductors or source voltage conductors formed on said resin layer, and an overcoat layer for covering said pairs of first and second trace conductors and said ground conductors or source voltage conductors.

11. The suspension as claimed in claim 1, wherein said suspension member includes a base plate, a load beam coupled with said base plate, and a resilient flexure fixed to a top end section of said load beam for mounting said head slider.

12. A head gimbal assembly including a head slider which has at least one write head element with terminal electrodes and at least one read head element with terminal electrodes, and a suspension for supporting at its top end section said head slider, said suspension comprising:

a resilient suspension member; and a lead conductor member including a pair of first trace conductors and a pair of second trace conductors, one end of each of said pair of first trace conductors being electrically connected to the terminal electrodes of said at least one write head element, one end of each of said pair of second trace conductors being electrically connected to the terminal electrodes of said at least one read head element, at least part of said lead conductor member being fixed to said suspension member, one trace conductor of said pair of first trace conductors being separately located at a side region of said suspension member in a top end section of said suspension member, and the other trace conductor of said pair of first trace conductors being separately located at an other side region of said suspension member in said top end section of said suspension member.

13. The head gimbal assembly as claimed in claim 12, wherein the top end section of said suspension member has two arms running along opposite side edges of said suspension member and a head slider support coupled with top ends of said two arms, and wherein one trace conductor of said pair of first trace conductors is formed on each of said two arms.

14. The head gimbal assembly as claimed in claim 12, wherein said lead conductor member includes a resin layer directly laminated on said suspension member, said pairs of first and second trace conductors formed on said resin layer, and an overcoat layer for covering said pairs of first and second trace conductors.

15. The head gimbal assembly as claimed in claim 12, wherein said lead conductor member includes a resin layer laminated on a thin metal plate which is fixed to said suspension member, said pairs of first and second trace conductors formed on said resin layer, and an overcoat layer for covering said pairs of first and second trace conductors.

16. The head gimbal assembly as claimed in claim 12, wherein said lead conductor member includes a FPC member consisting of a resin layer, said pairs of first and second trace conductors formed on said resin layer, and an overcoat layer for covering said pairs of first and second trace conductors.

17. The head gimbal assembly as claimed in claim 12, wherein one trace conductor of said pair of second trace conductors are separately located at a side region of said suspension member in the top end section of said suspension member, and the other trace conductor of said pair of first trace conductors being separately located at an other side region of said suspension member in said top end section of said suspension member.

18. The head gimbal assembly as claimed in claim 17, wherein said lead conductor member further includes a pair of ground conductors or a pair of source voltage conductors one of said pair of conductors inserted between said trace conductors at said side region and an other of said pair of conductors inserted between said trace conductors at said other side region.

19. The head gimbal assembly as claimed in claim 18, wherein said lead conductor member includes a resin layer directly laminated on said suspension member, said pairs of first and second trace conductors formed on said resin layer, said ground conductors or source voltage conductors formed on said resin layer, and an overcoat layer for covering said pairs of first and second trace conductors and said ground conductors or source voltage conductors.

20. The head gimbal assembly as claimed in claim 18, wherein said lead conductor member includes a resin layer laminated on a thin metal plate which is fixed to said suspension member, said pairs of first and second trace conductors formed on said resin layer, said ground conductors or source voltage conductors formed on said resin layer, and an overcoat layer for covering said pairs of first and second trace conductors and said ground conductors or source voltage conductors.

21. The head gimbal assembly as claimed in claim 18, wherein said lead conductor member includes a FPC member consisting of a resin layer, said pairs of first and second trace conductors formed on said resin layer, said ground conductors or source voltage conductors formed on said resin layer, and an overcoat layer for covering said pairs of first and second trace conductors and said ground conductors or source voltage conductors.

22. The head gimbal assembly as claimed in claim 12, wherein said suspension member includes a base plate, a load beam coupled with said base plate, and a resilient flexure fixed to a top end section of said load beam for mounting said head slider.

23. The head gimbal assembly as claimed in claim 12, wherein said at least one write head element and said at least one read head element comprise at least one magnetic write head element and at least one magnetic read head element, respectively.

24. The head gimbal assembly as claimed in claim 23, wherein said at least one magnetic read head element comprises a magnetoresistive effect read head element.

* * * * *